US008598297B2

(12) United States Patent
Bedri et al.

(10) Patent No.: US 8,598,297 B2
(45) Date of Patent: Dec. 3, 2013

(54) PREPOLYMERS MADE FROM HYDROXYMETHYL-CONTAINING POLYESTER POLYOLS DERIVED FROM FATTY ACIDS

(75) Inventors: Erdem Bedri, Midland, MI (US); Debkumar Bhattacharjee, Lake Jackson, TX (US); John N. Argyropoulos, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 376 days.

(21) Appl. No.: 11/665,119

(22) PCT Filed: Oct. 24, 2005

(86) PCT No.: PCT/US2005/038218
§ 371 (c)(1),
(2), (4) Date: Apr. 11, 2007

(87) PCT Pub. No.: WO2006/047434
PCT Pub. Date: May 4, 2006

(65) Prior Publication Data
US 2008/0096995 A1    Apr. 24, 2008

Related U.S. Application Data

(60) Provisional application No. 60/622,221, filed on Oct. 25, 2004.

(51) Int. Cl.
*C08G 18/42* (2006.01)
*C08G 18/10* (2006.01)
*C09J 175/06* (2006.01)
*C08L 75/06* (2006.01)
*C07C 271/08* (2006.01)

(52) U.S. Cl.
USPC ............... 528/59; 252/182.2; 252/182.24; 252/182.28; 521/159; 521/172; 521/173; 522/90; 522/97; 522/174; 528/28; 528/60; 528/61; 528/65; 528/74.5; 528/76; 528/80; 560/24; 560/25; 560/26; 560/115; 560/157; 560/158

(58) Field of Classification Search
USPC ........ 528/74.5, 80, 81, 28, 59, 60, 61, 65, 76; 560/24, 25, 26, 115, 157, 158; 521/159, 172, 173; 522/90, 97, 174; 252/182.2, 182.24, 182.28
See application file for complete search history.

(56) References Cited

U.S. PATENT DOCUMENTS

| | | |
|---|---|---|
| 3,427,334 A | 2/1969 | Belner |
| 3,427,335 A | 2/1969 | Herold |
| 4,218,543 A | 8/1980 | Weber et al. |
| 4,423,162 A | 12/1983 | Peerman et al. |
| 4,433,067 A | 2/1984 | Rice et al. |
| 4,543,369 A | 9/1985 | Peerman et al. |
| 4,599,401 A | 7/1986 | Koleske |
| 4,663,021 A | 5/1987 | Arai et al. |
| 4,731,486 A | 3/1988 | Abatjoglou et al. |
| 4,766,172 A | 8/1988 | Weber et al. |
| 4,792,574 A | 12/1988 | Berkowitz |
| 4,843,054 A | 6/1989 | Harper |
| 4,876,019 A | 10/1989 | Meyer et al. |
| 4,985,491 A | 1/1991 | Reisch |
| 5,300,535 A | 4/1994 | Takeyasu et al. |
| 5,451,631 A | 9/1995 | Guo |
| 5,552,486 A | 9/1996 | Guo et al. |
| 5,648,447 A | 7/1997 | Seneker et al. |
| 5,648,559 A | 7/1997 | Hager |
| 5,774,123 A | 6/1998 | Matson |
| 5,786,514 A | 7/1998 | Shen et al. |
| 5,811,566 A | 9/1998 | Watabe et al. |
| 5,817,703 A | 10/1998 | Blair et al. |
| 5,854,386 A | 12/1998 | Shen et al. |
| 5,856,369 A | 1/1999 | Jorgenson et al. |
| 5,856,372 A | 1/1999 | Ho et al. |
| 6,018,017 A | 1/2000 | Le-Khac |
| 6,022,903 A | 2/2000 | Younes et al. |
| 6,046,270 A | 4/2000 | Roesler et al. |
| 6,075,064 A | 6/2000 | Muller et al. |
| 6,103,849 A | 8/2000 | Squiller et al. |
| 6,255,537 B1 | 7/2001 | Hayashi et al. |
| 6,355,845 B1 | 3/2002 | Clement et al. |
| 6,429,342 B1 | 8/2002 | Clement et al. |
| 6,444,746 B1 | 9/2002 | Gindin et al. |
| 6,455,632 B1 | 9/2002 | Gindin et al. |
| 6,512,033 B1 | 1/2003 | Wu |
| 6,552,163 B1 | 4/2003 | Clement et al. |
| 6,762,270 B2 | 7/2004 | Ludewig et al. |
| 2003/0225244 A1 | 12/2003 | Nobori et al. |

FOREIGN PATENT DOCUMENTS

| | | |
|---|---|---|
| CA | 2162083 | 5/1996 |
| EP | 0139042 | 5/1985 |
| EP | 0142121 | 5/1985 |
| EP | 0143120 | 6/1985 |
| EP | 0397036 | 11/1990 |
| EP | 0763555 | 3/1997 |
| EP | 868455 | 10/1998 |
| EP | 1112243 | 7/2001 |

(Continued)

OTHER PUBLICATIONS

Szycher, Michael; Szycher's Handbook or Polyurethanes; CRC Press; New York; 1999; pp. 3-12-3-13.*
T.H. Khoe, F.H. Otey and E.N. Frankei, "Rigid Urethane Foams from Hydroxymethylated Linseed Oil and Polyol Esters", Northern Regional Research Laboratory, Peoria, Illinois 61604 USA.

*Primary Examiner* — Rabon Sergent
(74) *Attorney, Agent, or Firm* — Whyte Hirschboeck Dudek S.C.

(57) ABSTRACT

Prepolymers are prepared by a reaction of a polyisocyanate and a hydroxylmethyl containing polyester polyol derived from a fatty acid. The prepolymers can be prepared having isocyanate, hydroxyl, or a variety of other reactive functional groups. The prepolymers are useful in making polyurethanes and other polymers, or a crosslinking agents.

9 Claims, No Drawings

(56) References Cited

FOREIGN PATENT DOCUMENTS

| JP | HEI 5-163342 | 6/1993 |
| WO | WO-2004/020497 | 3/2004 |
| WO | WO-2004/096744 | 11/2004 |
| WO | WO-2004/096882 | 11/2004 |
| WO | WO-2004/096883 | 11/2004 |
| WO | WO-2006/047431 | 5/2006 |
| WO | WO-2006/047432 | 5/2006 |
| WO | WO-2006/047433 | 5/2006 |
| WO | WO-2006/065345 | 6/2006 |

* cited by examiner

PREPOLYMERS MADE FROM HYDROXYMETHYL-CONTAINING POLYESTER POLYOLS DERIVED FROM FATTY ACIDS

This application claims benefit of U.S. Provisional Application No. 60/622,221, filed Oct. 25, 2004.

The invention relates to urethane group-containing prepolymers made in the reaction of polyisocyanates with certain polyol materials that are derived from natural oils. The invention also relates to polyurethanes and other polymers made from such prepolymers.

Polyurethanes are used in a wide variety of applications, including cushioning foam, automotive body parts, wheels, casters and other cast and spray elastomers, structural foams, thermal insulating foam, coatings, adhesives and sealants. Aqueous polyurethane dispersions are used in a variety of films, coatings, adhesives and sealant applications. In addition, a great variety of hybrid polymeric materials exist which contain polyurethane or polyurea segments that are bonded into or blended with other polymer types. In order to form these various types of polyurethanes and hybrid materials, isocyanate-functional and isocyanate-reactive components are needed. In many cases, these components are prepared from simpler starting materials in order to obtain some application-specific advantage, such as a desirable viscosity, low VOCs, specific reactive groups, favorable component ratios, etc. Quite often, this is done by forming an isocyanate-terminated prepolymer through the reaction of an excess of a polyisocyanate with one or more isocyanate-reactive materials. However, the component ratios can be reversed to form an adduct having terminal hydroxyl or other isocyanate-reactive groups, if desired. The most common types of isocyanate-reactive materials are polyether polyols and polyester polyols. The polyether polyols are most typically a polymer of propylene oxide or a propylene oxide/ethylene oxide mixture. The polyester polyol may be derived from a cyclic lactone such as caprolactone, or may be derived from a low molecular weight polyol and a dicarboxylic acid anhydride, such as a butanediol/adipate polymer.

These polyether and polyester polyols are almost always derived from oil, gas or coal feedstocks. As these feedstocks are not renewable, there are concerns about the depletion of the natural resources from which they are derived. In addition, geopolitical factors often make the cost of these resources unpredictable. For these reasons, there is a desire to develop polyols that are derived from renewable resources. Various types of such polyols have been developed. However, these polyols differ significantly in structure, reactivity, polarity, compatibility and other physical and chemical characteristics from the commonly available polyether and polyester polyols, and therefore have not represented drop-in replacements for these materials in most applications. So far, polyols derived from renewable resources have found limited applications.

Accordingly, it would be desirable to provide a dispersion of polyurethane particles in an aqueous phase, in which a significant portion of the raw materials used to make the polyurethane are derived from renewable resources.

This invention is a prepolymer having at least one urethane group, comprising the reaction product of at least one isocyanate and an isocyanate-reactive material containing at least one hydroxymethyl-containing polyester polyol (HMPP) derived from a fatty acid.

The prepolymer is useful to make a variety of polymeric materials, including polyurethanes, polyureas, polyesters, UV-curable materials, various hybrid polymers, and the like.

The polymeric materials in some instances exhibit improved hydrolytic resistance/stability over similar materials made using conventional aliphatic polyester polyols, e.g. adipates and even caprolactone based polyester polyols.

These polymeric materials often exhibit lower water absorption than similar materials made from conventional polyether polyols, making them particularly useful for applications such as waterproofing membranes, for example. The low water absorption also makes the polymeric material useful for many adhesive applications, and in general in any application in which the final product is exposed to humid conditions or direct contact with water.

These polymer materials also sometimes exhibit good acid-etch resistance, which is an important parameter from a weatherability standpoint. Coatings made using the invention often exhibit good flexibility, particularly in applications where a balance of hardness and flexibility is desired.

The prepolymer of the invention is a reaction product of an isocyanate compound or mixture thereof and at least one isocyanate-reactive material. The isocyanate-reactive material includes at least one hydroxymethyl-containing polyester polyol (HMPP) which is derived from a fatty acid, as described more fully below. The term "derived from a fatty acid" is used herein to refer to materials using fatty acids or fatty acid esters as a starting material or intermediate.

The prepolymer is characterized as having an average of at least one urethane group/molecule, and typically will contain more than one urethane group per molecule. The number of urethane groups will be determined in each instance by the functionality of the isocyanate-reactive material(s) (i.e., number of isocyanate-reactive groups/molecule), the functionality of the isocyanate compound and the stoichiometric ratio of isocyanate-reactive material(s) and isocyanate compounds that are used to prepare the prepolymer. The prepolymer is generally further characterized as having reactive functional groups such as isocyanate, hydroxyl, carboxylic acid, carboxylic acid anhydride, epoxide, amino, silane or ethylenic unsaturation. The prepolymer suitably has a molecular weight of no greater than about 200,000, especially no greater than about 50,000. A preferred prepolymer has a number average molecular weight from about 500, or from about 800, or from about 1,000, or from about 1,200, to about 25,000, or to about 15,000, or to about 12,000, or to about 8,000, or to about 6,000.

The prepolymer is preferably a liquid at room temperature (~22° C.) or if a solid, one that has a melting temperature of no greater than 80° C., especially no greater than 50° C.

Suitable isocyanates for use in preparing the urethane include a wide variety of organic mono- and polyisocyanates. Polyisocyanates are generally preferred. Suitable monoisocyanates include benzyl isocyanate, toluene isocyanate, phenyl isocyanate and alkyl isocyanates in which the alkyl group contains from 1 to 12 carbon atoms. Suitable polyisocyanates include aromatic, cycloaliphatic and aliphatic isocyanates. Exemplary polyisocyanates include m-phenylene diisocyanate, tolylene-2-4-diisocyanate, tolylene-2-6-diisocyanate, isophorone diisocyanate, 1,3- and/or 1,4-bis(isocyanatomethyl)cyclohexane (including cis- or trans-isomers of either), hexamethylene-1,6-diisocyanate, tetramethylene-1,4-diisocyanate, cyclohexane-1,4-diisocyanate, hexahydrotolylene diisocyanate, methylene bis(cyclohexaneisocyanate) ($H_{12}$MDI), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), tolylene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2,4-diisocyanate, tolylene-2,6-diisocyanate or mixtures thereof. Diphenylmethane-4,4'-diisocyanate, diphenylmethane-2,4'-diisocyanate and mixtures thereof are generically referred to as MDI, and all can be used. Tolylene-2,4-diisocyanate, tolylene-2,6-diisocyanate and mixtures thereof are generically referred to as TDI, and all can be used.

Derivatives of any of the foregoing polyisocyanate groups that contain biuret, urea, carbodiimide, allophonate and/or isocyanurate groups can also be used. These derivatives often have increased isocyanate functionalities and are desirably used when a more highly crosslinked product is desired.

The isocyanate-reactive material includes at least one hydroxymethyl-containing polyester polyol (HMPP) that is derived from a fatty acid as described more fully below. The HMPP is characterized as having at least one ester group per molecule and at least one hydroxymethyl (—CH$_2$OH) group per molecule. The HMPP is conveniently derived from a hydroxymethyl-group containing fatty acid having from 12 to 26 carbon atoms, or an ester of such a hydroxymethylated fatty acid. It can be prepared by reacting the hydroxymethyl-group containing fatty acid with a polyol, hydroxylamine or polyamine initiator compound having an average of at least 1, preferably at least about 2 hydroxyl, primary amine and/or secondary amine groups/molecule. Proportions of starting materials and reaction conditions are selected such that the resulting HMPP contains an average of at least 1.3 repeating units derived from the hydroxymethyl-group containing fatty acid or ester thereof for each hydroxyl, primary amine and secondary amine group in the initiator compound, and the HMPP has an equivalent weight of at least 400 up to about 15,000. Equivalent weight is equal to the number average molecular weight of the molecule divided by the combined number of hydroxyl, primary amine and secondary amine groups.

The HMPP suitably has an average of at least 2, preferably at least 2.5, more preferably at least 2.8, to about 12, more preferably to about 6, even more preferably to about 5, hydroxyl, primary and secondary amine groups combined per molecule. The HMPP also suitably has an equivalent weight of at least 400, such as at least about 600, at least about 650, at least about 700, or at least about 725, to about 15,000, such as to about 6000, to about 3500, up to about 1700, up to about 1300, or to about 1000.

The HMPP advantageously is a mixture of compounds having the following average structure:

$$[H-X]_{(z-p)}-R-[X-Z]_p \quad (I)$$

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≥1.3 times z, and each A is independently selected from the group consisting of A1, A2, A3, A4 and A5, provided that at least some A groups are A1, A2 or A3. A1 is:

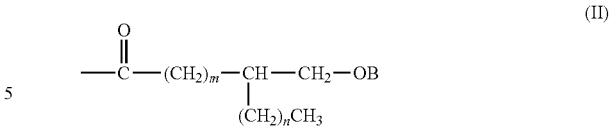

wherein B is H or a covalent bond to a carbonyl carbon atom of another A group; m is number greater than 3, n is greater than or equal to zero and m+n is from 8 to 22, especially from 11 to 19. A2 is:

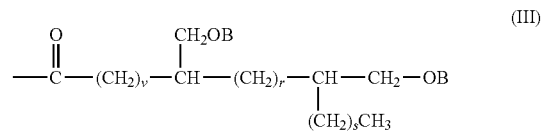

wherein B is as before, v is a number greater than 3, r and s are each numbers greater than or equal to zero with v+r+s being from 6 to 20, especially 10 to 18. A3 is:

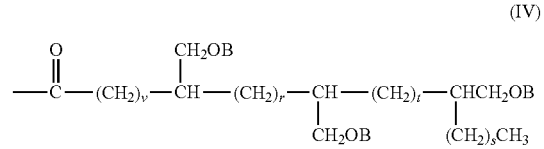

wherein B, v, each r and s are as defined before, t is a number greater than or equal to zero, and the sum of v, r, s and t is from 5 to 18, especially from 10 to 18. A4 is

where w is from 10-24, and A5 is

where R' is a linear or branched alkyl group that is substituted with at least one cyclic ether group and optionally one or more hydroxyl groups or other ether groups. The cyclic ether group may be saturated or unsaturated and may contain other inert substitution. The hydroxyl groups may be on the alkyl chain or on the cyclic ether group, or both. The alkyl group may include a second terminal —C(O)— or —C(O)O— group through which it may bond to another initiator molecule. A5 groups in general are lactols, lactones, saturated or unsaturated cyclic ethers or dimers that are formed as impurities during the manufacture of the hydroxylmethyl-group containing fatty acid or ester. A5 groups may contain from 12 to 50 carbon atoms.

In formula I, z is preferably from 2 to 8, more preferably from 2 to 6, even more preferably from 2 to 5 and especially from about 3 to 5. Each X is preferably —O—. The total average number of A groups per hydroxymethylated polyol molecule is preferably at least 1.5 times the value of z, such from about 1.5 to about 10 times the value of z, about 2 to about 10 times the value of z or from about 2 to about 5 times the value of z.

A is preferably A1, a mixture of A1 and A2, a mixture of A1 and A4, a mixture of A1, A2 and A4, a mixture of A1, A2 and A3, or a mixture of A1, A2, A3 and A4, in each case optionally containing a quantity of A5. Mixtures of A1 and A2 preferably contain A1 and A2 groups in a mole ratio of 10:90 to 95:5, particularly from 60:40 to 90:10. Mixtures of A1 and A4 preferably contain A1 and A4 groups in a mole ratio of 99.9:0.1 to 70:30, especially in a ratio of from 99.9:0.1 to 85:15. Mixtures of A1, A2 and A4 preferably contain from about 10 to 95 mole percent A1 groups, 5 to 90 percent A2 groups and up to about 30 percent A4 groups. More preferred mixtures of A1, A2 and A4 contain from 25 to 70 mole-% A1 groups, from 15 to 40% A2 groups and up to 30% A4 groups. Mixtures of A1, A2 and A3 preferably contain from 30 to 80 mole-% A1, from 10 to 60% A2 and from 0.1 to 10% A3 groups. Mixtures of A1, A2, A3 and A4 groups preferably contain from 20 to 50 mole percent A1, 1 to about 65 percent A2, from 0.1 to about 10 percent A3 and up to 30 percent A4 groups. Especially preferred polyester polyols of the invention contain a mixture of from 20 to 50% A1 groups, from 20 to 50% A2 groups, 0.5 to 4% A3 groups and from 15 to 30% A4 groups. In all cases, A5 groups advantageously constitute from 0 to 7%, especially from 0 to 5%, of all A groups.

Preferred mixtures of A groups conveniently contain an average of about 0.8 to about 1.5 —CH$_2$OH and —CH$_2$OB groups/A group, such as from about 0.9 to about 1.3 —CH$_2$OH and/or —CH$_2$OB groups/A group or from about 0.95 to about 1.2 —CH$_2$OH and/or —CH$_2$OB groups/A group. Such mixtures of A groups (1) allow the initiator functionality to mainly determine the polyester polyol functionality and (2) tend to form less densely branched polyester polyols.

"Inertly substituted" groups are groups that do not react with an isocyanate groups and which do not otherwise engage in side reactions during the preparation of the hydroxymethyl-group containing polyester polyol. Examples of such inert substituents include as aryl, cycloalkyl, silyl, halogen (especially fluorine, chlorine or bromine), nitro, ether, ester, and the like.

HMPPs according to structure I can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transterification reaction with a lower alkanol, especially methanol or ethanol, to produce alkyl esters of the constituent fatty acids. The resulting alkyl esters may be hydrolyzed to the corresponding fatty acids if desired, but this step is usually not necessary. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in WO 04/096744. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—CH$_2$OH) groups while hydrogenating residual carbon-carbon bonds to remove essentially all carbon-carbon unsaturation. The resulting mixture of hydromethylated fatty acids is then reacted with an initiator compound, with removal of water or lower alkanol to form the polyester polyol.

The initiator contains two or more hydroxyl, primary amine or secondary amine groups, and can be a polyol, an alkanol amine or a polyamine. Initiators of particular interest are polyols. Polyether polyol initiators are useful, including polymers of ethylene oxide and/or propylene oxide having from 2 to 8, especially 2 to 4 hydroxyl groups/molecule and a molecular weight of from 150 to 3000, especially from 200 to 1000. Lower (i.e., less than 400, preferably from 31 to 125) equivalent weight initiators include materials commonly used as chain extenders and crosslinkers in polyurethane formulations. These include ethylene glycol, diethylene glycol, 1,2-propylene glycol, dipropylene glycol, tripropylene glycol, cyclohexanedimethanol, ethylene diamine, phenylene diamine, bis(3-chloro-4-aminophenyl)methane, 2,4-diamino-3,5-diethyl toluene, diethanol amine, monoethanol amine, triethanol amine, mono- di- or tri(isopropanol) amine, glycerine, trimethylol propane, pentaerythritol, and the like.

Hydroxymethyl-containing fatty acids made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bends unless stringent reaction conditions are used. Carbon-carbon double bonds that are not hydroformylated generally become hydrogenated.

Methods of making such hydroxymethyl-containing polyester polyols are described in WO 04/096744.

The HMPP so produced generally contains some unreacted initiator compound, and may contain unreacted hydromethylated fatty acids (or esters). Initiator compounds often react only monofunctionally or difunctionally with the fatty acids (or esters), and resulting polyester polyol often contains free hydroxyl or amino groups bonded directly to the residue of the initiator compound.

The HMPP may be alkoxylated, if desired, to introduce polyether chains onto one or more of the hydroxymethyl groups or functional groups attached to the residue of the initiator compound. The hydroxyl groups on the HMPP may also be converted to amino groups via a reductive amination process.

The isocyanate-reactive material may in addition include one or more other materials that have isocyanate-reactive groups, including materials having one or more hydroxyl, primary amine, secondary amine or epoxide groups. These other isocyanate-reactive materials may be of various types. For example, other isocyanate-reactive materials having an equivalent of 400 or greater, especially from about 400 to about 8,000, or about 500 to about 3,000 or from about 600 to about 2,000 can be used. Examples of such higher equivalent weight materials include polyether polyols, polyester polyols, polycarbonate polyols, and aminated polyethers. They typically will have a functionality (isocyanate-reactive groups/molecule) of about 1 to about 8, especially from about 1.8 to about 3.5. The polyethers of interest include homopolymers of propylene oxide, ethylene oxide or tetrahydrofuran, for example, and random and/or block copolymer of propylene oxide and ethylene oxide. Polyesters of interest include polylactones and butanediol/adipate polyesters The isocyanate-reactive material may also include a chain extender. For the purposes of this invention, a chain extender means a material having two isocyanate-reactive groups per molecule and an equivalent weight per isocyanate-reactive group of less than 400, preferably less than 200 and especially from 31 to 125. The isocyanate reactive groups are preferably hydroxyl, primary aliphatic or aromatic amine or secondary aliphatic or aromatic amine groups. Representative chain extenders include amines ethylene glycol, diethylene glycol, 1,2-propylene glycol, dipropylene glycol, tripropylene glycol, cyclohexane dimethanol, ethylene diamine, phenylene diamine, bis(3-chloro-4-aminophenyl)methane and 2,4-diamino-3,5-diethyl toluene.

The polyol component may contain one or more crosslinkers in addition to the high equivalent weight polyols described above. For purposes of this invention "crosslinkers" are materials having three or more isocyanate-reactive groups per molecule and an equivalent weight per isocyanate-reactive group of less than 400. Crosslinkers preferably contain from 3 to 8, especially from 3 to 4 hydroxyl, primary amine or secondary amine groups per molecule and have an equivalent weight of from 30 to about 200, especially from 50 to 125. Examples of suitable crosslinkers include diethanol amine, monoethanol amine, triethanol amine, mono- di- or tri(isopropanol) amine, glycerine, trimethylol propane, pentaerythritol, and the like.

The HMPP may constitute at least 10%, at least 25%, at least at least 35%, at least 50%, or at least 65% of the total weight of the isocyanate-reactive materials used to make the prepolymer. The HMPP may constitute 75% or more, 85% or more, 90% or more, 95% or more or even 100% of the total weight of the isocyanate-reactive material. For example, the HMPP(s) may constitute from 20 to 65%, from 35 to 65%, from 65 to 100% or from 80 to 100% of the total weight of isocyanate-reactive materials.

The prepolymer may have a variety of types of functional groups, depending on the particular starting materials used and their relative proportions. A preferred kind of functional group is an isocyanate group. The prepolymer may have isocyanate-reactive functional groups, such as hydroxyl or primary or secondary amine groups. The prepolymer may have other types of functional groups such as epoxide, carboxylic acid, carboxylic acid anhydride or similar groups.

Isocyanate-Functional Prepolymers

Isocyanate-functional prepolymers are of particular interest, as they form starting materials that are useful to prepare a wide variety of polyurethane and polyurethane-urea products. These materials are characterized by having an average of at least one, preferably an average of at least 1.8, isocyanate groups/molecule. These materials may contain from about 2.0, or from about 2.2, or from about 2.5, to about 6, to about 4, to about 3.5 or to about 3.0 isocyanate groups/molecule, on average.

A polyisocyanate is suitably used to prepare an isocyanate-functional prepolymer of the invention, although mixtures of mono- and polyisocyanates can be used. In order to produce a low molecular weight product that is liquid or low-temperature melting, the isocyanate(s) are used in an amount that provides greater than one equivalent of isocyanate groups per equivalent of isocyanate-reactive group present in the isocyanate-reactive mixture. It is preferred to provide at least 1.5, especially at least 1.8, even more preferably at least 2.0 equivalents of isocyanate groups/equivalent of isocyanate-reactive group.

When approximately one mole (such as from about 0.85 to about 1.15 or from about 0.95 to about 1.05 moles) of polyisocyanate compounds are used per equivalent of isocyanate-reactive groups, the isocyanate-reactive materials become "capped" with the polyisocyanate. The resulting prepolymer is a statistical distribution of products of various molecular weights, as well as some unreacted monomer. The average molecular weight closely approximates $MW_{(isocyanate-reactive\ material)} + n\ MW_{(isocyanate)}$, where n is the number of isocyanate-reactive groups per molecule of isocyanate-reactive material. In this case, relatively few unreacted isocyanate-reactive groups remain and there is little if any unreacted isocyanate compound. These prepolymers thus have the advantage of having low levels of volatile isocyanate compounds. Isocyanate-terminated prepolymers of this type are useful in a variety of applications, such as cast and spray elastomer applications, moisture-curable sealants and adhesives, two-part sealants and adhesives, aqueous polyurethane dispersions, and the like. In each instance, the prepolymer may be tailored in specific ways to adapt it for its particular usage.

For cast elastomer applications, aromatic polyisocyanates such as toluene diisocyanate, MDI, and PMDI, or mixtures thereof with an aliphatic polyisocyanate are preferred, except when high stability to light is needed. When good light stability is needed, aliphatic polyisocyanates such as $H_{12}MDI$, isophorone diisocyanate, 1,3- and/or 1,4-bis(isocyanatomethyl)cyclohexane and hexamethylene diisocyanate are preferable. The isocyanate-reactive material may contain only the HMPP. If other isocyanate-reactive materials are used, they are preferably one or more high equivalent weight polyols such as a 400-6,000 equivalent weight polyether polyol, especially a poly(propylene oxide) or propylene oxide/ethylene oxide copolymer in which polymerized propylene oxide constitutes at least 80 and especially at least 90% of the total polyol weight. The polyether polyol may contain mainly secondary hydroxyl groups. This polyether polyol preferably has a functionality of from 1.8 to about 3, especially from about 2 to about 3. The additional high equivalent weight polyol(s) suitably constitute from about 20 to about 65% of the total weight of the isocyanate-reactive compounds used to make the prepolymer. It is also possible to include a small amount of chain extenders and/or crosslinkers in the isocyanate-reactive material. These typically will constitute no more than about 20%, especially up to about 10% of the total weight of the isocyanate-reactive materials. This prepolymer most suitably has an isocyanate equivalent weight of about 500 to about 8,000.

A similar prepolymer is suitable for one-part, moisture curable adhesive and sealant applications. Here, the HMPP is used alone as the sole component of the isocyanate reactive material, or else is suitably used in conjunction with a high equivalent weight polyether polyol or polyester polyol and/or a chain extender. The high equivalent weight polyether polyol is preferably a poly(propylene oxide) or copolymer of poly (propylene oxide) and up to about 12% by weight ethylene oxide, having a functionality of up to about 3 and an equivalent weight of about 500 to about 1500.

Yet another application for these prepolymers as a binder for use in making rebounded foam cushion and for recycling rubber crumb into molded items or to make sport floor systems for indoor and/or outdoor use.

When more than one mole of polyisocyanate or polyisocyanate/monoisocyanate mixture is used per equivalent of isocyanate-reactive material, the resulting product generally is a mixture of an isocyanate-terminated prepolymer as described before and some amount of unreacted isocyanate compounds. Mixtures of this type are often referred to in the art as "quasi-prepolymers". They may have an isocyanate content up to about 30% by weight, such as from 20 to 30% by weight. Quasi-prepolymers can be used in the same applications in which the above-described prepolymers are used. In addition, quasi-prepolymers of this type are particularly useful in making polyurethane elastomers in a so-called reaction injection molding (RIM), structural reaction injection molding (SRIM) or reinforced reaction injection molding (RRIM) process. The quasi-prepolymers are also particularly useful in making molded foam and microcellular elastomers. For all of these applications, preferred polyisocyanates include TDI, MDI, carbodiimide-modified MDI (such as Isonate® 143L from Dow Chemical) and polymeric MDI.

The quasi-prepolymer will typically contain about 1 to about 60, preferably from about 5 to about 40%, by weight unreacted polyisocyanate compound. The HMPP may be used as the sole isocyanate-reactive material, or it may be blended with one or more other high equivalent weight materials such as polyether polyols or another polyester polyol. For RIM, SRIM and RRIM applications, it may be desirable to include a chain extender and/or crosslinker in the isocyanate-reactive materials. Quasi-prepolymers of particular interest are made with a blend of the HMPP and a crosslinker and/or chain extender. The amount of crosslinker and/or chain extender is such that the combined weight of the isocyanate compounds and crosslinker and/or chain extender, is from about 5 to about 80% of the total weight of the isocyanate compound and all isocyanate-reactive materials. This ratio of isocyanate compounds plus crosslinker and/or chain extender to total weight of reactants is sometimes referred to herein as the "hard segment content". Hard segment contents of from 20 to 60%, especially from 25 to 45% are of particular interest in quasi-prepolymers for RIM, SRIM and RRIM applications.

When less than one mole of isocyanate compound is used per equivalent of isocyanate-reactive materials, the resulting product will tend to be a mixture of materials that include a significant number of species in which two or more molecules of the isocyanate-reactive material(s) are coupled together to form a higher molecular weight oligomer.

Isocyanate-terminated prepolymers of the invention can be tailored for specific applications by adjusting the ratios of components and in some instances by the selection of additional isocyanate-reactive materials. A first example of this is the control of hard segment content, primarily through the use of lower equivalent weight HMPP materials and the use of chain extender and/or crosslinker materials in making the prepolymer. In general, the use of higher hard segment content prepolymer tends to form a harder, more crosslinked and less elastomeric polymer when cured. For example, elastomeric polyurethanes generally are made using a prepolymer having a hard segment content of 5 to 30% by weight, whereas structural elastomers (such as is RIM, SRIM and RRIM) tend to employ prepolymers having a hard segment content of from 25 to 60%, especially from 25 to 45% by weight. For forming hard coatings for wood and metal, a prepolymer having a hard segment content of from 30 to 60% is often used.

Another example of this is an isocyanate-terminated prepolymer that is water-dispersible. Such prepolymers are useful in making aqueous polyurethane/urea dispersions, because the prepolymer is sufficiently water-dispersible that it can form stable droplets in an aqueous phase. This water-dispersibility can be achieved by using a somewhat hydrophilic isocyanate-reactive material to prepare the product, in addition to the HMPP. Suitable such hydrophilic isocyanate-reactive materials include polymers of ethylene oxide, random or block copolymers of ethylene oxide in which the polymerized ethylene oxide constitutes at least 50% of its weight, and compounds having one or more, preferably two or more isocyanate-reactive groups and a carboxylic acid, carboxylate, sulfonate or quaternary ammonium group, such as dimethylolpropionic acid or salts thereof. Water-dispersibility can also be imparted to the isocyanate-terminated prepolymer if the HMPP contains a poly(ethylene oxide) block of significant length (such as about 10 or more, especially about 25 or more, oxyethylene units). Groups such as this can be introduced into the HMPP by using a poly(ethylene oxide) polymer or copolymer as the initiator compound.

Another example of a specialized isocyanate-terminated prepolymer of the invention is one adapted for microcellular foam applications. In this case, a propylene oxide/ethylene oxide copolymer containing about 20 to 90% ethylene oxide by weight and having mainly primary hydroxyl groups can be used as an additional isocyanate-reactive material. Such copolymer may constitute from 10 to 60% of the weight of all isocyanate-reactive materials, and have an equivalent weight of from 1000 to about 6000. Another propylene oxide/ethylene oxide copolymer particular suitable for such an application is one having from 1 to 20% internally polymerized ethylene oxide, and an equivalent weight of from 1000 to 6000. Yet another type is a 2000-6000 equivalent weight, low unsaturation random copolymer of 85-98% by weight propylene oxide and 2-15% by weight ethylene oxide. The resulting prepolymers are particularly suitable for making molder microcellular materials such as shoe soles and frothed foam materials such as attached foam carpet cushioning. They conveniently have an isocyanate content of from 3 to 20%.

A fourth type of specialized isocyanate-functional prepolymer contains polymerizable unsaturation. One way such unsaturation can be introduced is to include a hydroxy-functional acrylate or methacrylate compound in the isocyanate-reactive materials. Suitable such hydroxy-functional acrylates and methacrylates include, for example, hydroxyalkyl esters of acrylic or methacrylic acid, and addition products of an alkylene oxide such as ethylene, propylene or butylenes oxide with acrylic or methacrylic acid. Examples of suitable hydroxy-functional acrylates and methacrylates include 2-hydroxyethyl acrylate, 2-hydroxyethyl methacrylate (HEMA), 2-hydroxylpropyl acrylate, 2-hydroxypropyl methacrylate, 4-hydroxy-n-butyl acrylate, 2-hydroxy-n-butyl acrylate, 2-hydroxy-n-butyl methacrylate, 4-hydroxy-n-butyl methacrylate, poly(oxyethylene)- and/or poly(oxypropylene)-esters of acrylic or methacrylic acid, wherein the number of oxyethylene and/or oxypropylene groups is preferably from 2 to 10, and the like. Of the foregoing, the methacrylates are preferred. HEMA is especially preferred. The presence of this unsaturation allows the prepolymer to be cured via a free-radical polymerization and/or via an ultraviolet (UV) curing mechanism. For these applications, up to 100% of the isocyanate-groups can be capped with the hydroxyl-functional acrylate or methacrylate compound. It may be desirable to form a prepolymer containing both isocyanate groups and ethylenically unsaturated groups by capping only a portion (such as from 10-95%) of the isocyanate groups. For applications in which UV curing is desired, the prepolymer can be blended with a polymerization promoter and, if desired, one or more additional polymerizable ethylenically unsaturated monomers. An example of such an application is described in U.S. Pat. No. 6,699,916. UV-curable systems containing such prepolymers can be used as adhesives and structural foams, or to make a variety of soft or hard coating materials as are used for electronics such as cell phones and military or wood-coating applications.

It is also possible to add a smaller proportion of acrylate or methacrylate groups to the prepolymer to improve adhesion to certain substrates. In such a case, it is generally suitable to use from about 0.01 to about 0.10 equivalent of hydroxyl-functional acrylate or methacrylate per isocyanate equivalent provided by the polyisocyanate. A preferred range is from about 0.02 to about 0.08 equivalent of hydroxyl-functional acrylate or methacrylate per equivalent of isocyanate compound(s). A more preferred range is from about 0.025 to about 0.06 equivalent/equivalent. The resulting acrylate- or methacrylate-functional prepolymer is useful for making hybrid urethane-acrylate or urethane-methacrylate polymers having various (i.e., IPN, core-shell or other) morphologies, and for making one- or two-part structural adhesive foams for automotive and other applications.

Isocyanate-terminated prepolymers may be blocked to form heat-activated isocyanate-functional materials.

Hydroxyl-Functional Urethanes

By using the isocyanate-reactive materials in excess, the prepolymer of the invention can be provided with hydroxyl functionality. In general, hydroxyl-terminated prepolymers can be prepared using the same starting materials as described above, the difference being in the relative ratios of components. As before, the selection of particular starting materials, including the use of additional isocyanate-reactive materials such as polyether polyols, polyester polyols, chain extenders and/or crosslinkers, allows a wide range of hydroxyl-terminated prepolymers to be made that are tailored for specific applications.

The hydroxyl-terminated prepolymers of the invention are useful in a wide variety of polyurethanes applications. They can in general be used analogously to the isocyanate-terminated prepolymers, with the exception of course that the hydroxyl-terminated materials will be cured using polyisocyanate compounds. The hydroxyl-terminated prepolymers may be used in conjunction with other isocyanate-reactive materials as needed or desirable for particular polyurethane applications.

Applications of particular interest include various water-borne and non-aqueous coating, adhesive and sealant applications. In such applications, the hydroxyl-terminated prepolymer is dispersed into an aqueous phase, and cured by mixing the dispersion with a polyisocyanate. A water-borne polyisocyanate emulsion is particularly suitable for these applications. The polyisocyanate may have isocyanurate, carbodiimide, biuret, allophonate or other linkages, which may produce a higher functionality polyisocyanate. Hard coatings made in this manner are useful coatings for military equipment, automotive equipment, automotive windshields, goggles and other eyewear and the like.

Hydroxyl-terminated prepolymers of the invention can also polymerize with reactive compounds other than polyisocyanates, which nonetheless contain hydroxyl-reactive groups. Examples of such reactive compounds include, for example, carboxylic acid anhydrides, particularly cyclic anhydrides, which can react with the hydroxyl-terminated prepolymer to form a polyester. Diester and dicarboxylic acid compounds can engage in transesterification reactions with the hydroxyl-terminated prepolymer, again to form polyesters. The hydroxyl-terminated prepolymer can be used as a crosslinking agent for polycarboxylic acid-containing polymers, such as polymers and copolymer of acrylic or methacrylic acid.

Prepolymers Containing Other Functional Groups

Both the isocyanate-functional prepolymers and the hydroxyl-functional prepolymers of the invention contain functional groups that can be used to introduce other types of functionality to the urethane. Examples of such functionality include carboxylic acid, carboxylic acid anhydride, epoxide, ethylenic unsaturation, amino, silane, and the like. This functionality can be introduced in several ways. One approach is to chemically modify the existing functional group to convert it to another desirable functional group. An example of this is to convert terminal isocyanate groups to urethane or urea groups by reaction with a monoalcohol or water, and then hydrolyze the urethane groups to form terminal primary amino groups. A second example is to oxidize terminal hydroxyl groups to form carboxylic acid groups.

Another approach is to react the existing functional groups with a bireactive material that contains both the new functional group that is desired, and a second reactive group that will react with the existing functional group on the urethane to form a covalent bond.

Bireactive materials useful for imparting specialized functionality to isocyanate-terminated urethanes include hydroxy- or amino-functional ethylenically unsaturated compounds such as hydroxyalkyl acrylates and methacrylates, aminoalkyl acrylates and methacrylates, hydroxyl-functional carboxylic acids and carboxylic acid anhydrides, hydroxyl-containing epoxide compounds such as bisphenol-A/glycidyl ether-type epoxies, hydroxyl- or amino-functional alkoxy silanes, and the like. Diamines used in excess can be used to introduce terminal amino groups to an isocyanate-terminated prepolymer.

Bireactive materials useful for imparting specialized functionality to hydroxyl-terminated urethanes include ethylenically unsaturated isocyanates such as isocyanatoethylmethacrylate, ethylenically unsaturated carboxylic acids, acid halides or acid anhydrides, epoxy-functional isocyanates, carboxylic acids, acid halides or acid anhydrides, ethylenically unsaturated alkoxy silanes such as vinyl trimethoxysilane, as well as many others.

Methods of making epoxy-functional adducts from hydroxy-functional materials are described, for example, in U.S. Pat. No. 4,599,401 and EP 139,042, EP 143,120 and EP 142,121—those methods can be adapted to the use of the urethanes described herein. A particular method of introducing terminal alkoxysilane groups is described in U.S. Pat. No. 6,762,270.

Prepolymers of the invention that have ethylenic unsaturation are useful as UV curable materials and as raw materials in polyurethane adhesives, sealants and/or structural foam applications, as described before.

Prepolymers of the invention having carboxylic acid or carboxylic anhydride functional groups are useful for making polyesters, and a crosslinking agents for polymers having pendant hydroxyl groups, such as polyvinyl alcohol or polymers of a hydroxyalkyl acrylate or methacrylate, for example.

Prepolymers of the invention that have silane functionality, in particular hydrolyzable silane groups such as mono-, di- or trialkoxysilane groups, are useful in a wide range of sealant, elastomer, coating and adhesive applications in which moisture curing is desired.

Epoxy-functional prepolymers of the invention can be cured using well-known amine curing agents to form epoxy resins for adhesive, electronics potting, and other applications.

As discussed, the prepolymer of the invention is useful in a wide variety of polyurethane-forming reactions, as well as an intermediate in making other types of polymers such as polyesters, polycarbonates, vinyl-polyurethane hybrid polymers, and the like. The types of polymer for which the prepolymer is useful will of course be determined largely by the particular functional groups that are present.

In general, polyurethanes can be prepared by reacting an isocyanate-functional prepolymer of the invention with water and/or additional isocyanate-reactive materials. Methods for accomplishing this are well known in the art. General methods for making cast and microcellular elastomers are described, for example, in U.S. Pat. Nos. 5,648,447, 6,022,903, 5,856,372 and EP 868,455, among many others. Methods for making polyurethane sealant and adhesive compositions are described in U.S. Pat. Nos. 4,985,491, 5,774,123, 6,103,849, 6,046,270 and 6,512,033, among others. Aqueous polyurethane dispersion production methods are described, for example, in U.S. Pat. Nos. 4,792,574, 6,444,746 and 6,455,632. Reaction injection molding methods for is making polyurethane and/or polyurea polymers are described, for example, in U.S. Pat. Nos. 4,876,019, 4,766,172, 4,433,067 and 4,218,543. General methods for making rebond foam are described in U.S. Pat. No. 5,817,703.

The prepolymer can be blended with a variety of types of useful additives, including, for example, surfactants, catalysts, pigments, dyes, fillers, dryers, rheological and viscosity modifiers, dispersants, surfactants, preservatives, antimicrobials, pesticides, fertilizers and the like.

The following examples are provided to illustrate the invention, but are not intended to limit the scope thereof. All parts and percentages are by weight unless otherwise indicated.

EXAMPLES 1-5 AND COMPARATIVE SAMPLES A-C

A series of isocyanate-terminated prepolymers are made from the following ingredients:

of about 2.0. It is a reaction product of methyl (9,10)-hydroxymethyl stearate and cyclohexane dimethylol. Poly (EO) A is a 1000 molecular weight poly(ethylene oxide) diol. Poly(EO) B is a 950 molecular weight poly(ethylene oxide) monol. DMPA is dimethylolproprionic acid. Aromatic Isocyanate A is a mixture containing 4,4'-diphenylmethane diisocyanate as a main component and a small quantity of 2,4-diphenylmethane diisocyanate. Aliphatic Isocyanate A is isophorone diisocyanate.

All prepolymers except for Example 5 are prepared by charging the polyol, poly(EO) and isocyanate to a stirred reactor. The reactor is purged with dry nitrogen and kept at 60° C. for 10-15 minutes. Enough benzoyl chloride is added to neutralize the basicity of polyols if needed. The reactor is then heated at 70 to 90° C. until the desired level of conversion is attained (~2-4 hours). Prepolymers are characterized by their % NCO content according to ASTM method D5155-96. The viscosities of the resulting prepolymers are then measured using a Brookfield LVF viscometer at 40° C. according to ASTM D 4878-88.

Prepolymer Example 5 is made in the same manner, except N-methyl pyrrolidone (NMP) is used as a solvent to facilitate the solution of the DMPA into the other components and reduce the viscosity of the resulting prepolymer. In addition, the prepolymer is neutralized with triethyl amine during the chain-extension step to convert approximately 90% of the carboxylic acid groups to carboxylate groups.

Dispersions are prepared from each of the foregoing prepolymers by continuously feeding the prepolymer into a high

| Sample | Comp. Sample A | Comp. Sample B | Comp. Sample C | Ex. 1 | Ex. 2 | Ex. 3 | Ex. 4 | Ex. 5 |
|---|---|---|---|---|---|---|---|---|
| Polyether Polyol A | 61.7 | | | | | | | |
| Polyether Polyol B | | 64.4 | | | | | | |
| Polyester Polyol A | | | 63.9 | | | | | |
| HMPP A | | | | 69.3 | | 64 | | |
| HMPP B | | | | | 71.80 | | | |
| HMPP C | | | | | | | 63.3 | 59 |
| Poly (EO) A | 3.5 | 3.5 | 3 | 3.0 | 3.0 | 3 | 3 | |
| Poly (EO) B | 1.8 | 2 | | 1.5 | 1.5 | — | | |
| DMPA | | | | | | | | 3.5 |
| Aromatic Isocyanate A | 31 | 28 | | 26.2 | 23.7 | — | | |
| Aliphatic Isocyanate A | | | 33.1 | | | 33 | 33.7 | 37.5 |
| % NCO (wt %) | 6.0 | 6.0 | 5.0 | 5.53 | 5.54 | 5.5 | 5.5 | 5.0 |
| Viscosity (40 C., cps) | 6003 | 6098 | 53,260 | 6900 | 10,780 | 9700 | 53,000 | 14,080 |

Polyether Polyol A is an ethylene oxide-capped polypropylene oxide), available commercially as Voranol™ 9287 polyol from Dow Chemical. It has a hydroxyl equivalent weight of about 2000. Polyether Polyol B is an ethylene oxide-capped poly(propylene oxide), available commercially as Voranol™ 4701 polyol from Dow Chemical. It has a hydroxyl equivalent weight of about 1600. Polyester Polyol A is a polycaprolactone diol having a number average molecular weight of about 850. It is sold commercially by Dow Chemical as Tone™ 0210 polyol. HMPP A is a hydroxymethyl-containing polyester polyol having a hydroxyl equivalent weight of about 1000. It is the reaction product of methyl (9,10)-hydroxymethyl stearate and a difunctional initiator. It has a functionality of about 2.0. HMPP B is a hydroxymethyl-containing polyester polyol having a hydroxyl equivalent weight of about 1600 and a hydroxyl functionality of about 3. HMPP C is a hydroxymethyl-containing polyester polyol having an equivalent weight of about 420 and a functionality shear mixer at a constant rate. A predetermined amount of surfactant is merged with a chilled (10-15° C.) deionized water stream (initial aqueous) at a constant rate and fed into the mixer where the prepolymer is emulsified to form a first stage emulsion containing ~75-85 wt % of the prepolymer. The high concentration dispersion exiting the mixer first stage emulsion is continuously passed into a second mixer where it is diluted with an aqueous chain extender solution. The product is collected in an oversized container to allow $CO_2$ gas (which evolves from reaction of the excess isocyanate groups with water) to be released.

The viscosities of each dispersion are measured at room temperature using a Brookfield viscometer. The solids content is in each case about 54-58 wt %, as measured by an IR-200 Moisture Analyzer (Denver Instrument Company). The solids are calculated using this instrument by removing the volatile aqueous phase followed by a gravimetric determination of the amount of non-volatile dispersed polymer phase that remains. The particle size of the dispersions ranges from 0.08 to 1.0 micrometer, as determined by dynamic light scattering techniques using a Coulter LS 230 apparatus. Shear stabilities of the dispersions are measured by using a Hamilton beach mixer and AR2000 Rheometer, supplied by TA Instruments.

Coatings are prepared from each of the dispersions by drawing them down on polished and dried cold rolled steel panels using a #60 wire wound rod to achieve a target dry film thickness between 1.5 to 2.0 mils. The wet coating films are allowed to dry at room temperature for 30 minutes and then forced dried in an oven at 80° C. for 120 minutes.

EXAMPLE 6 AND COMPARATIVE SAMPLE D

A hydroxymethyl-containing polyester polyol is prepared by charging 330.4 grams of methyl (9,10)-hydroxymethylstearate, 72.4 grams of an approximately 1:1 mixture of 1,3 and 1,4-cyclohexanedimethanol and 0.411 grams of dibutyltin oxide catalyst to a 500 milliliter five-neck round bottom glass flask equipped with a mechanical stirrer, condenser, addition funnel, nitrogen inlet, and a sensor to monitor/control reaction temperature. The mixture is heated to 150° C. with stirring using an external hot oil bath and maintained at that temperature for one hour. The temperature is then raised in 10° C. increments every 45 minutes until a final reaction temperature of 200° C. is obtained. A total of 30 grains of methanol are collected (90% of theoretical production) and the resulting hydroxymethyl-containing polyester polyol is collected. It has a hydroxyl equivalent weight of about 400.

78.15 grams of the hydroxymethyl-containing polyester polyol, 8.21 grams of dimethylolpropionic acid, 49.14 grams of NMP, and 0.0882 grams of dibutyl tin dilaurate catalyst are added to a 250 milliliter five-neck round bottom glass flask equipped with a mechanical stirrer, condenser, addition funnel, nitrogen inlet, and a Therm-O-Watch sensor to monitor/control reaction temperature. The mixture is heated to 80° C. with stirring using an external hot oil bath. Nitrogen is sparged through the solution for two hours until the concentration of water is measured to be below 200 ppm. The reactor contents are then cooled to 75° C. 58.82 grams of isophorone diisocyanate are slowly added to the reaction mixture at such a rate that the reaction temperature is maintained at about 75° C. After all the isocyanate is added, the reaction temperature is increased to about 83° C. and maintained at that temperature for 3 hours. 4.67 grams of triethylamine are added and the temperature maintained at about 83° C. for an additional 20 minutes. The reactor contents are then cooled to 60° C. and a total of 166.7 grams of the reaction mixture are added to an 8 ounce glass bottle containing 112.3 grams of deionized water under high speed agitation. 5.07 grams of ethylene diamine in 55 grams of deionized water are then added to the aqueous dispersion and high speed agitation is maintained for an additional 20 minutes to produce dispersion Example 6.

Comparative Dispersion Sample D is prepared in a similar manner using 67.47 grams of a polycaprolactone diol (Tone® 210, from Dow Chemical) 6.75 grams of dimethylolpropionic acid, 41.45 grams of NMP, 45.17 grams of isophorone diisocyanate and 0.0767 grams of dibutyl tin dilaurate to form the prepolymer; 3.78 grams of triethylamine to neutralize the carboxylate groups supplied by the DMPA; and 4.10 grams of ethylene diamine to chain extend the prepolymer.

Dispersion Example 6 and Comparative Sample D are each drawn down into films as described with respect to Examples 1-5. The oven-cured coatings are allowed to stand for 24 hours before their physical properties are measured. Film thickness is determined according to ASTM D 1186. Gloss measurements are made using a BYK Labotron Gloss Unit in accordance with ASTM D 526. Impact resistance is determined using a Gardner Impact Tester and following ASTM D 2794. Abrasion resistance is evaluated using a Taber abrader with CS-17 wheels, 1000 g weights and 500 cycles. Pencil hardness is determined in accordance with ASTM D 3363. Acid etch resistance is determined by placing drops of a 10% solution of sulfuric acid on the coatings for 60 hours and observing the visual effect on the film A whitening of the coating surface indicates moderate etch and severe etch is indicated by a blistered coating surface. Water resistance is evaluated in a similar way, using deionized water. Solvent resistance of the coating is reported as the number of methyl ethyl ketone (MEK) rubs that are required to cut through the coating to the substrate. Results are as indicated in the following table.

| Properties | Example 6 | Comparative Sample D |
|---|---|---|
| Solids (wt. %) | 38.5 | 34.2 |
| Viscosity (cps) | 100 | 20 |
| Particle Size (microns) | 0.064 | 0.129 |
| Pencil Hardness | 2H | 2H |
| Impact Resistance - Direct/Reverse | 200/200 | 200/200 |
| Gloss - 20°/60° | 78/87 | 79/87 |
| Abrasion Resistance | 8.1 | 5.7 |
| Solvent Resistance | 85 | 60 |
| Water Resistance | No Effect | Slight Effect |
| Acid Etch Resistance | No Effect | Severe Effect |

The coating made using dispersion Example 6 has excellent toughness (balance of hardness and flexibility), good appearance (high gloss), and excellent abrasion resistance, as does the coating made from Comparative Sample D. The water and solvent resistance of the coatings made from dispersion Example 6 are superior relative to Comparative Sample D.

What is claimed is:

1. A prepolymer comprising at least one urethane group, an average of between 1.8 and 6 isocyanate groups per molecule, and a number average molecular weight of from 500 to 8,000, wherein the prepolymer is a liquid at 22° C. and comprises the reaction product of at least one isocyanate and an isocyanate-reactive material containing at least one hydroxymethyl-containing polyester polyol (HMPP) derived from a fatty acid, wherein the HMPP has the following average structure:

$$[H\text{---}X]_{(z-p)}\text{---}R\text{---}[X\text{---}Z]_p \quad (I)$$

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≥1.3 times z, and each A is independently selected from the group consisting of A1, A2, A3, A4 and A5, wherein A1 is:

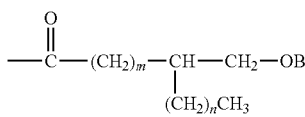
(II)

wherein B is H or a covalent bond to a carbonyl carbon atom of another A group; m is a number greater than 3, n is greater than or equal to zero and m+n is from 11 to 19, and wherein A1 is from 20 to 50 mole-% of A; A2 is:

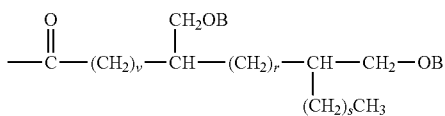
(III)

wherein B is as before, v is a number greater than 3, r and s are each numbers greater than or equal to zero with v+r+s being from 10 to 18, and wherein A2 is from 1 to 65 mole-% of A; A3 is:

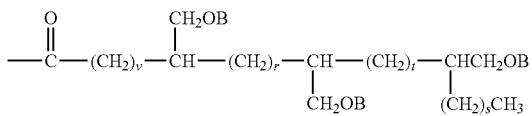
(IV)

wherein B, v, each r and s are as defined before, t is a number greater than or equal to zero, and the sum of v, r, s, and t is from 10 to 18, and wherein A3 is from 0.1 to 10 mole-% of A; A4 is

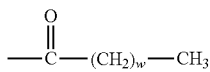
(V)

where w is from 10 to 24, and wherein A4 is up to 30 mole-% of A, and A5 is

(VI)

where R' is a linear or branched alkyl group that is substituted with at least one cyclic ether group and optionally one or more hydroxyl groups or other ether groups, and wherein A5 is from 0 to 5 mole-% of A,
wherein (i) the prepolymer is water-dispersable and contains at least one poly(ethylene oxide) block, or (ii) the prepolymer is dissolved in a solvent.

2. The prepolymer of claim 1 wherein the HMPP is prepared by reacting a hydroxymethyl group-containing fatty acid having from 12 to 26 carbon atoms, or an ester of such a hydroxymethyl group containing fatty acid, with a polyol or polyamine initiator compound having an average of at least 1 hydroxyl, primary amine and/or secondary amine group/molecule, such that the HMPP contains an average of at least 1.3 repeating units derived from the hydroxymethyl-group-containing fatty acid or ester per total number of hydroxyl, primary amine and secondary amine groups in the initiator compound.

3. The prepolymer of claim 1, wherein the isocyanate-reactive material further contains at least one isocyanate-reactive material in addition to the HMPP.

4. The prepolymer of claim 1, wherein the isocyanate-reactive material further contains a second polyol comprising at least one of a polyether polyol and a polyester polyol.

5. The prepolymer of claim 1, which contains at least one additive selected from the group consisting of surfactants, catalysts, pigments, dyes, fillers, dryers, rheological and viscosity modifiers, dispersants, surfactants, preservatives, antimicrobials, pesticides, and fertilizers.

6. A polymer prepared by curing a prepolymer of claim 1.

7. The polymer of claim 6 which is an adhesive.

8. The polymer of claim 6, which is cured by reaction with moisture.

9. The polymer of claim 6, which is cured by reaction with a polyol, polyamine or aminoalcohol.

* * * * *